US012779459B2

(12) United States Patent
Goux

(10) Patent No.: US 12,779,459 B2

(45) Date of Patent: Nov. 3, 2026

(54) MICROFLUIDIC DEVICE

(71) Applicant: IMEC VZW, Leuven (BE)

(72) Inventor: Ludovic Goux, Hannut (BE)

(73) Assignee: IMEC VZW, Leuven (BE)

( * ) Notice: Subject to any disclaimer, the term of this patent is extended or adjusted under 35 U.S.C. 154(b) by 458 days.

(21) Appl. No.: 17/933,454

(22) Filed: Sep. 19, 2022

(65) Prior Publication Data

US 2023/0105724 A1 Apr. 6, 2023

(30) Foreign Application Priority Data

Sep. 20, 2021 (EP) .................................... 21197853

(51) Int. Cl.
*B01L 3/00* (2006.01)

(52) U.S. Cl.
CPC ... *B01L 3/502715* (2013.01); *B01L 3/502753* (2013.01); *B01L 3/502761* (2013.01); *B01L 2300/0864* (2013.01); *B01L 2400/0415* (2013.01); *B01L 2400/0424* (2013.01); *B01L 2400/0487* (2013.01)

(58) Field of Classification Search
CPC ......... B01L 3/502715; B01L 3/502753; B01L 3/502761; B01L 2300/0864; B01L 2400/0415; B01L 2400/0424; B01L 2400/0487
See application file for complete search history.

(56) References Cited

U.S. PATENT DOCUMENTS

| | | | | |
|---|---|---|---|---|
| 7,081,192 | B1 | 7/2006 | Wang et al. | |
| 7,744,737 | B1 * | 6/2010 | James | B01D 57/02 204/632 |
| 2014/0083858 | A1 | 3/2014 | Teh et al. | |
| 2017/0128941 | A1 * | 5/2017 | Sadri | G01N 15/1023 |

FOREIGN PATENT DOCUMENTS

| | | | |
|---|---|---|---|
| WO | WO 2009/061843 | A2 | 5/2009 |
| WO | WO 2020/176548 | A1 | 9/2020 |

OTHER PUBLICATIONS

Liang et al. Wall-induced lateral migration in particle electrophoresis through a rectangular microchannel. Journal of Colloid and Interface Science. 2010; 347, 142-146 (Year: 2010).*

Choi S and Park J. Microfluidic system for dielectrophoresis separation based on a trapezoidal electrode array. Lab on a Chip, 2005; 5, 1161-1167 (Year: 2005).*

(Continued)

*Primary Examiner* — Shizhi Qian
*Assistant Examiner* — Randall Lee Gamble, Jr.
(74) *Attorney, Agent, or Firm* — Knobbe, Martens, Olson & Bear, LLP

(57) ABSTRACT

A microfluidic device is provided. In one aspect, the microfluidic device includes a microfluidic channel, and a first actuator including an array of electrodes along the microfluidic channel. The first actuator is configured to generate a a potential wave along the microfluidic channel. Each electrode of the array can see its voltage changing cyclically according to a period multiplied by a natural number, wherein for at least one electrode the natural number equals 1. The cyclically changing voltages of adjacent electrodes can be out of phase. The cyclically changing voltages of every other electrode along the array can be in phase.

23 Claims, 1 Drawing Sheet

(56) References Cited

OTHER PUBLICATIONS

Dalmay et al. A microfluidic device with removable packaging for the real time visualization of intracellular effects of nanosecond electrical pulses on adherent cells. Lab Chip, 2012; 12, 4709-4715 (Year: 2012).*
Zhao et al. A dielectrophoresis-based microchannel system. Journal of Applied Physics. 2009; 105, 064510-1 to 064510-7 (Year: 2009).*
Liao et al. Precisely sized separation of multiple particles based on the dielectrophoresis gradient in the z-direction. Microfluid Nanofluid. 2012; 12, 201-211 (Year: 2012).*
Groisman et al. Microfluidic Memory and Control Devices, Science 2003; 300, 955-958 (Year: 2003).*
Thorsen et al. Microfluidic Large-Scale Integration. Science 2002; 298; 580-584 (Year: 2002).*
Wang et al. Digital microfluidic operations on micro-electrode dot array architecture. IET Nanobiotechnology 2011; 5(4), 152-160 (Year: 2011).*
Extended European Search Report dated Mar. 11, 2022 in European Application No. 21197853.1, in 10 pages.
Kim et al., "Dielectrophoresis: From Molecular to Micrometer Scale Analytes," *Analytical Chemistry*, 91.1: 277-295 (2018).
Manshadi et al., "Induced-charge electrokinetics in microfluidics: a review on recent advancements", *J. Micromech. Microeng.*, 30 (Sep. 2020), 16 pages.
Wang et al., "Dielectrophoretic Driving of Blood Cells in a Microchannel", *Biotechnology & Biotechnological Equipment*, 25:2 (Apr. 2011), 2405-2411.
Yen et al., "A Low-Power CMOS Microfluidic Pump Based on Travelling-Wave Electroosmosis for Diluted Serum Pumping", *Scientific Reports* (Oct. 2019) 9:14794.

* cited by examiner

MICROFLUIDIC DEVICE

CROSS-REFERENCE TO RELATED APPLICATIONS

This application claims foreign priority to European Application No. 21197853.1, filed Sep. 20, 2021, which is incorporated by reference herein in its entirety.

BACKGROUND

Technological Field

The disclosed technology is related to the field of microfluidic devices, in particular to the aspect of a microfluidic device including an actuator for translocating charged particles, and to the aspect of a method of translocating charged particles.

Description of the Related Technology

Three-dimensional (3D) NAND Flash memory is one of the highest density storage memory technologies. Further scaling can be achieved by adding more alternating polysilicon/oxide (P/O) layers to the stack. However, industries foresee that the cost-effectiveness of stacking will reach a limit beyond about 500 layers. Therefore, concepts enabling larger storage memory densities are currently being considered to prepare for the post-3D-NAND era.

One concept enabling higher storage memory densities is a colloidal nanofluidic memory. Its principle is to store information using particles that move into and out of microfluidic channels. The diameter of the channels is scalable below 10 nm. The information is stored by the order of the particles in a channel. The combination of these aspects would allow reaching larger densities than 3D NAND Flash memory, that is, in the range of greater than 1 Tbit/mm$^2$.

Mechanisms envisaged to write the information, which includes moving the particles into and through the channel, are electro-osmosis and dielectrophoresis. Electro-osmosis includes creating an electric double layer by charging the inner sidewalls of the channel, while a vertical field would allow to move the mobile layer and pull the fluid. For dielectrophoresis, the speed of the particles also depends on the field frequency and the dielectric constant of the particles.

However, these mechanisms may not provide a sufficiently large writing speed. Some preliminary simulations suggest that a memory device using electro-osmosis or dielectrophoresis to move particles might still compete with 3D NAND Flash memory. Still, the writing speed may be a limiting factor for the channel length and, therefore, further density increase.

Also in the context of other (that is, non-memory) microfluidic devices, there is a need for fast translocation of particles through microfluidic channels.

There is thus still a need in the art for devices and methods that address at least some of the above problems.

SUMMARY OF CERTAIN INVENTIVE ASPECTS

An object of the disclosed technology is to provide microfluidic devices and methods for translocating one or more charged particles in a microfluidic channel.

The above and other objectives are accomplished by a method and apparatus according to the disclosed technology.

It is an advantage of embodiments of the disclosed technology that fast translocation of charged particles may be achieved. It is an advantage of embodiments of the disclosed technology that the translocation may be faster than translocation via other methods in the field, such as electro-osmosis or dielectrophoresis. It is an advantage of embodiments of the disclosed technology that the microfluidic channel may be long, and, at the same time, the passage time of particles through the microfluidic channel may be short. It is, therefore, a further advantage of embodiments of the disclosed technology that the microfluidic device may be scalable.

It can be an advantage of embodiments of the disclosed technology that the required structure and circuitry may be uncomplicated. It can be a further advantage of embodiments of the disclosed technology that the microfluidic device may be used in a broad range of applications wherein charged particles are to be moved through a microfluidic channel, for example, in colloidal nanofluidic memory devices.

In a first aspect, the disclosed technology relates to a microfluidic device including: a) a microfluidic channel, and b) a first actuator including an array of electrodes along the microfluidic channel, wherein the first actuator is configured to generate a potential wave along the microfluidic channel.

The first actuator can be configured in such a way that, in operation, each electrode of the array sees its voltage changing cyclically according to a period multiplied by a natural number, wherein for at least one electrode (31, 32) the natural number equals 1, and the cyclically changing voltages of adjacent electrodes are out of phase. The first actuator can also be configured in such a way that, in operation, each electrode of the array sees its voltage changing cyclically according to a same period, and the cyclically changing voltages of adjacent electrodes are out of phase.

In a second aspect, the disclosed technology relates to a method of translocating a charged particle along a microfluidic channel in a microfluidic device according to embodiments of the first aspect. The method can include providing a device according to embodiments of the first aspect including a fluid including at least one charged particle, wherein at least part of the fluid is included in the microfluidic channel, and generating a potential wave along the microfluidic channel, for example, by applying a cyclically changing voltage to each electrode of the array according to a period multiplied by a natural number, wherein for at least one electrode (31, 32) (and, in some cases, for all of the electrodes) the natural number equals 1, and in such a way that the cyclically changing voltages of adjacent electrodes are out of phase.

Although there has been constant improvement, change, and evolution of devices in this field, embodiments of the disclosed technology are believed to represent substantial new and novel improvements, including departures from prior practices, resulting in the provision of more efficient, stable, and reliable devices of this nature.

The above and other characteristics, features, and advantages of the disclosed technology will become apparent from the following detailed description, taken in conjunction with the accompanying drawings, which illustrate, by way of example, the principles of the disclosed technology. This description gives examples that are illustrative, without limiting the scope of the disclosed technology.

Figure 1:
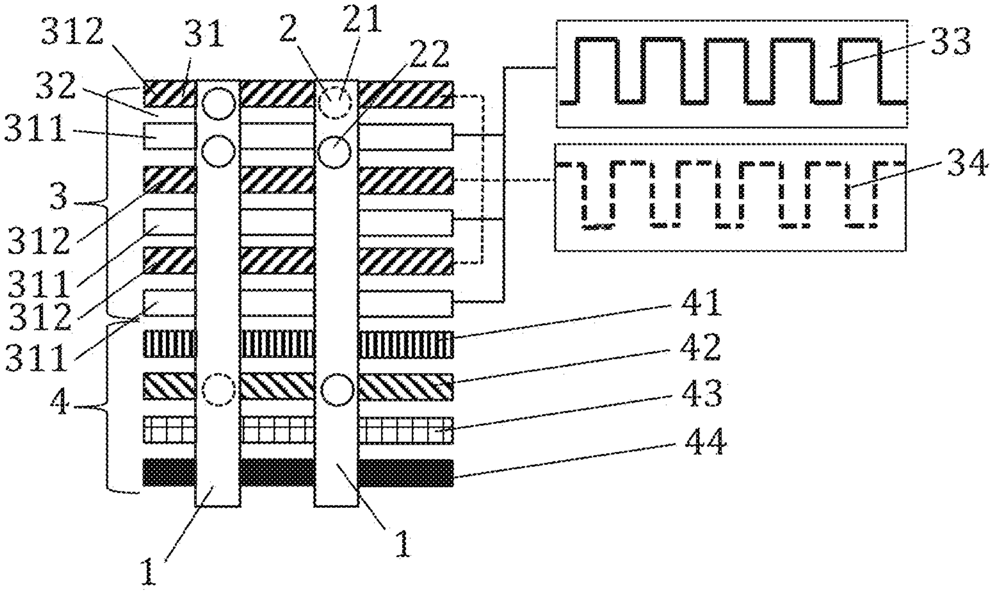
FIG. 1 is a schematic cross-section view of part of a microfluidic device according to embodiments of the disclosed technology.

In the different FIGURES, the same reference signs refer to the same or analogous elements.

DETAILED DESCRIPTION OF CERTAIN ILLUSTRATIVE EMBODIMENTS

The disclosed technology will be described with respect to particular embodiments and with reference to certain drawings, but the disclosed technology is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the disclosed technology.

Furthermore, the terms first, second, third, and the like in the description and the claims are used for distinguishing between similar elements and not necessarily for describing a sequence, either temporally, spatially, in ranking, or any other manner. It is to be understood that the terms so used are interchangeable under appropriate circumstances and that the embodiments of the disclosed technology described herein are capable of operation in other sequences than described or illustrated herein.

Moreover, the terms top, bottom, over, under, and the like in the description and the claims are used for descriptive purposes and not necessarily for describing relative positions. It is to be understood that the terms so used are interchangeable under appropriate circumstances and that the embodiments of the disclosed technology described herein are capable of operation in other orientations than described or illustrated herein.

It is to be noticed that the term "comprising," used in the claims, should not be interpreted as being restricted to the features listed thereafter; it does not exclude other elements or steps. It is thus to be interpreted as specifying the presence of the stated features, integers, steps, or components as referred to, but does not preclude the presence or addition of one or more other features, integers, steps or components, or groups thereof. The term "comprising" therefore covers the situation where only the stated features are present and the situation where these features and one or more other features are present. The word "comprising" according to the disclosed technology therefore also includes as one embodiment that no further components are present. Thus, the scope of the expression "a device comprising means A and B" should not be interpreted as being limited to devices consisting only of components A and B. It means that with respect to the disclosed technology, the only relevant components of the device are A and B.

Similarly, it is to be noticed that the term "coupled" should not be interpreted as being restricted to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure, or characteristic described in connection with the embodiment is included in at least one embodiment of the disclosed technology. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of exemplary embodiments of the disclosed technology, various features of the disclosed technology are sometimes grouped together in a single embodiment, figure, or description thereof for the purpose of streamlining the disclosure and aiding in the understanding of the disclosed technology. This method of disclosure, however, is not to be interpreted as reflecting an intention that the disclosed technology requires more features than are expressly recited in each claim. Rather, embodiments of the disclosed technology can include less than all features of a single foregoing disclosed embodiment. Thus, the claims following the detailed description are hereby expressly incorporated into this detailed description, with each claim standing on its own as a separate embodiment of this disclosed technology.

Furthermore, while some embodiments described herein include some but not other features included in other embodiments, combinations of features of different embodiments are meant to be within the scope of the disclosed technology, and form different embodiments, as would be understood by those in the art. For example, in the following claims, any of the claimed embodiments can be used in any combination.

In the description provided herein, numerous specific details are set forth. However, it is understood that embodiments of the disclosed technology may be practiced without these specific details. In other instances, some methods, structures, and techniques have not been shown in detail so as not to obscure an understanding of the disclosed technology.

The disclosed technology will now be described by a detailed description of several non-limiting embodiments of the disclosed technology. Other embodiments of the disclosed technology can be suitably implemented without departing from the disclosed technology.

In a first aspect, the disclosed technology relates to a microfluidic device including: a) a microfluidic channel, and b) a first actuator configured to generate a potential wave along the microfluidic channel. The potential wave has the effect of putting in motion or accelerating the motion of charged particles present in the channel.

The first aspect of the disclosed technology can relate to a microfluidic device including: a) a microfluidic channel, and b) a first actuator including an array of electrodes along the microfluidic channel, wherein the first actuator is configured in such a way that, in operation, each electrode of the array sees its voltage changing cyclically according to a period multiplied by a natural number, wherein for at least one electrode the natural number equals 1, and the cyclically changing voltages of adjacent electrodes are out of phase. In the context of the disclosed technology, a natural number is understood to be an integer number of at least 1. The natural number may be different for different electrodes of the array. In other words, the at least one electrode of the array sees its voltage changing cyclically according to a period, and all other electrodes of the array see their voltage changing according to the period multiplied by a natural number that is at least 2. Different electrodes may relate to different natural numbers. In some embodiments, the natural number may be selected, for each electrode independently, from an integer of from 1 to 10, such as from an integer of from 1 to 5, such as from an integer of from 1 to 2. Each electrode of the array can see its voltage changing cyclically according to a same period, that is, the natural number equals 1 for each electrode of the array.

In operation, as the voltages of adjacent electrodes are out of phase, a voltage difference is generated between the adjacent electrodes at least part of the time. Hence, at least part of the time, an electric field is generated between the adjacent electrodes in a direction from a first end (for example, inlet) to a second end (for example, outlet) of the microfluidic channel. Thereby, in operation, the cyclically changing voltage of each electrode may electrophoretically induce and/or accelerate a translocation of a charged particle in the microfluidic channel between the adjacent electrodes. The translocation may be in a direction from a first end (for example, inlet) to a second end (for example, outlet) of the microfluidic channel, or from the second end to the first end. In some embodiments, when the device of the first aspect is a memory device, the direction from the first end to the second end can be the write direction and the direction from the second end to the first end can be the read direction. For subsequent voltage change periods of the electrodes, the translocation can be in the same direction.

In some embodiments, the microfluidic channel has a width, in a direction perpendicular to a direction from a first end to a second end, of at most 100 nm, such as at most 20 nm. For instance, the microfluidic channel may have a width of from 1 to 20 nm. In some embodiments, the microfluidic channel has a length, from a first end to a second end, of from 100 nm to 100 μm. In some embodiments, the microfluidic channel has an aspect ratio, that is, a ratio of the length, from a first end to a second end, to the width, in a direction perpendicular to a direction from a first end to a second end, of from 100 to 10000. The electrodes of the array are along the microfluidic channel. In other words, subsequent electrodes within the array occupy subsequent positions along the length of the microfluidic channel. In some embodiments, each electrode of the array has an extent measured along the length of the microfluidic channel of from 1 nm to 20 nm, such as from 3 to 10 nm. In some embodiments, the electrodes of the array include, for example, consist of, metal or polycrystalline silicon.

In embodiments, a plurality of microfluidic channels is present, each coupled to a same or different first actuator. In the case of memory devices, a plurality of microfluidic channels can enable more information to be stored.

In some embodiments, each space between adjacent electrodes of the array has an extent measured along the length of the microfluidic channel of from 1 nm to 10 nm. Herein, each space between adjacent electrodes can include an electrically insulating material. In some embodiments, the electrodes are separated from each other by an electrical insulator, such as an oxide, for example, $SiO_2$. This can be advantageous because stacks including alternating layers of polycrystalline silicon and an oxide are easy to manufacture using suitable (industrial) setups. For example, such stacks may be made using techniques and apparatus used at present in the manufacturing of flash, for example, NAND flash memory devices.

In some embodiments, the array of electrodes has an extent measured along the length of the microfluidic channel of at least 70%, such as at least 90%, of the length of the microfluidic channel. This can be advantageous as this permits achieving a fast translocation of a charged particle over a large part of the microfluidic channel. The length of the microfluidic channel is measured from the first end to the second end. For instance, it is measured from the inlet to the outlet or, if no outlet is present, from the inlet to the end of the microfluidic channel.

In some embodiments, the microfluidic device further includes a fluid including at least one charged particle of a first species. The fluid is typically a liquid. The fluid may be any fluid suitable for dispersing the at least one charged particle, for example, organic solvents or water. Herein, the fluid may include dispersing agents suitable for dispersing the at least one charged particle.

When a fluid is present, at least part of the fluid is included in the microfluidic channel. If a reservoir and a fluid are present (see infra), a part of the fluid is present in the microfluidic channel and another part of the fluid is included in the reservoir. Typically, more than one charged particle of the first species are present in the fluid. In some embodiments, a plurality of charged particle species is present in the fluid. When this is the case, typically, more than one charged particle of each species is present in the fluid.

In the context of the disclosed technology, only charged particles having a mean width of at least 0.5 nm, such as at least 1 nm, are considered as a charged particle of a first or further species. The charged particles can be charged nanoparticles, having a diameter of from 1 nm to 100 nm. As used herein and unless provided otherwise, when reference is made to a charged particle, a charged particle of a first or further species is meant, that is, a charged particle having a mean width of at least 0.5 nm, such as at least 1 nm.

In some embodiments, each species of charged particles of a first or further species present in the fluid has a mean width of at most 10 nm. As used herein, the width is the smallest dimension of the particle and the mean width is the sum of the width of all particles of one species present in the fluid, divided by the number of particles of the species in the fluid. It can be advantageous to have the widest species of charged particles present in the fluid that has a smaller mean width than twice the mean width of the narrowest species of charged particles present in the fluid. Each species of charged particle of a first or further species present in the fluid may be independently selected from any type of charged particles, such as charged nano-objects (for example, charged nanoparticles), and charged molecules. Charged nano-objects possess one or more nanoscale dimensions, while charged nanoparticles are nano-objects with three nanoscale dimensions. Nanoscale dimensions are dimensions measuring at most 100 nm, and typically at least 1 nm. In some embodiments, each species of particle present in the fluid may be independently selected from Janus particles, homogeneous particles, and particles including a core and a shell wherein a material of the core is different from a material of the shell (that is, core-shell particles). Core-shell particles are, for instance, described in Kim, D., Sonker, M., and Ros, A., *Dielectrophoresis: From Molecular to Micrometer Scale Analytes*, Analytical Chemistry, 91.1:277-295 (2018).

In some embodiments, one, more than one, or all of the species of charged particle present in the fluid may be spheroid or spherical. However, the disclosed technology is not limited thereto, and one, more than one, or all species of charged particle present in the fluid may have an irregular shape. In some embodiments, all species of charged particle present in the fluid have the same charge sign. In some embodiments, a charge of the particles of the first species has a same sign as a charge of the particles of a second species. This can be advantageous because aggregation of the first and second particles may thereby be prevented by repulsion between the particles. More generally, all species of charged particle present in the fluid can have a charge having the same sign. In some embodiments, a magnitude of the charge of the first particles is the same as a magnitude of the charge of the second particles. This can be advantageous because the first actuator may induce a similar translocation (similar with respect to, for example, direction and speed) for all charged particles, for example, for each of the first species of particles and of the second species of particles. More generally, all species of charged particle present in the fluid can have a charge having the same sign and same magnitude.

In some embodiments, the different species of charged particles differ with respect to at least one of the following features: material composition; dielectric coefficient; shape; or size. In some embodiments, each species of charged particle includes or consists of a metal, a semiconductor, or a dielectric material. In some embodiments, each species of charged particles includes or consists of organic molecules, for example, biopolymers such as proteins or nucleic acid particles (for example, virus or virus parts), or they could be inorganic particles coated with organic molecules.

In some embodiments, particles of a first species may have a dielectric constant that is lower than the dielectric constant of the fluid, and particles of a second species may have a dielectric constant that is higher than the dielectric constant of the fluid.

In some embodiments, the array of electrodes includes at least two (for example, consists of two) series of regularly spaced electrodes. In some embodiments, the array may consist of electrodes of the first series alternating with electrodes of the second series. In these embodiments, the two series of electrodes may be interdigitated. In some embodiments, the actuator may be configured in such a way that, in operation and within each series, the cyclically changing voltage of each electrode is in phase. In some embodiments, wherein the array of electrodes consists of regularly spaced electrodes of the first series alternating with regularly spaced electrodes of the second series (for example, two interdigitated series of regularly spaced electrodes), the actuator is configured in such a way that, in operation, the cyclically changing voltages of every other electrode along the array are in phase. In some embodiments, wherein the array of electrodes consists of regularly spaced electrodes of the first series alternating with regularly spaced electrodes of the second series, the actuator may be configured in such a way that, in operation, the cyclically changing voltages of adjacent electrodes are out of phase by half of a period.

However, the disclosed technology is not limited to an array of electrodes consisting of regularly spaced electrodes of the first series alternating with regularly spaced electrodes of the second series. In an alternative example, the array of electrodes may consist of more than two electrode series, such as three electrode series, each consisting of regularly spaced electrodes, wherein the array includes a repeating pattern of three electrodes belonging to different series, wherein the actuator is configured in such a way that, in operation, adjacent electrodes of the array are out of phase by a third of the period. In general, the array of electrodes may consist of n series of regularly spaced electrodes, wherein the array includes a repeating pattern of n electrodes belonging to different series, wherein the actuator is configured in such a way that, in operation, adjacent electrodes of the array are out of phase by 1/n of the period.

As indicated above, the array of electrodes may consist of two series of electrodes. An advantage of these embodiments is that the first actuator may continue and/or accelerate the translocation of charged particles in any of two directions within the microfluidic channel. The first direction is from the first end (for example, an inlet) to the second end (for example, an outlet or a closed-end) of the microfluidic channel. The second direction is from the second end to the first end of the microfluidic channel. In that case, when the first actuator operates on a charged particle which is at rest (and if Brownian motion is ignored), the charged particle can be moved in any of both directions, depending on where the electrodes surrounding the charged particle are in their voltage change cycle. When the first actuator operates on a charged particle which is already in motion, the first actuator has globally the effect of continuing and/or accelerating this movement while conserving the direction of that movement. Indeed, even in cases where the electrodes surrounding the charged particle are in a place of their voltage change cycle that creates a force opposing the movement of the charged particle, the inertia of the particle will typically allow the particle to maintain the direction of its initial movement until the electrodes surrounding the charged particle are in a place of their voltage change cycle that creates a force enhancing the movement of the charged particle. The initial movement of the particle can, for instance, be due to the first actuator acting on the particle at rest (see above) or can be due to a second or a third actuator (see below). In these embodiments wherein the array consists of two series of electrodes, the microfluidic device can include the second or the third actuator, and in some cases can include at least the second actuator. A same translocation speed may be achieved in the direction from the first end to the second end and in the direction from the second end to the first end. In some embodiments wherein the array of electrodes includes more than two series of electrodes, the potential wave may be limited to propagation either in a direction from the first end to the second end, or in a direction from the second end to the first end. In that case, the charged particle may propagate in the same direction as the potential wave, so that the translocation of the charged particle may not depend on its initial movement or on a direction induced by, for example, the second or third actuator.

In some embodiments, the first actuator may be configured in such a way that, in operation, each electrode of the array sees its voltage changing cyclically within a range of voltages having a minimum and a maximum, wherein the minimum takes a same first voltage value for each electrode of the array (for example, 0 V), and the maximum takes a same second voltage value (for example, 5 V) for each electrode of the array. In some embodiments, the first actuator may be configured in such a way that, in operation, each electrode of the array sees its voltage changing cyclically within a range of voltages having a minimum and a maximum separated by a voltage of from 1 to 10 V. In some embodiments, the first actuator may be configured in such a way that, in operation, the cyclically changing voltage of each electrode has a same minimum equal to 0 V with respect to a ground potential of the microfluidic device. Herein, the voltage may be in the presence of a fluid in the microfluidic channel. In some embodiments, the first actuator may be configured in such a way that, in operation, each electrode of the array sees its voltage changing cyclically between only two voltage values being a minimum and a maximum voltage value, for example, the cyclically changing voltage may be a square wave voltage. In some embodiments where the first actuator includes an array consisting of n series of electrodes, the first actuator may be configured in such a way that, in operation, the cyclically changing voltage of each electrode at a position p in the array is at its maximum when the cyclically changing voltage of electrodes at a position from p−n+1 to p−1 are at their minimum. As such, in some embodiments wherein adjacent electrodes of the array are out of phase by 1/n of the period, the first actuator may be configured in such a way that, in operation (for example, in a first mode of operation) when in a first time interval, each electrode at a position p in the array is at its maximum, and when in a second, subsequent, time interval (which can be contiguous to the first time interval), each electrode at a position p+1 is at its maximum. It can be an advantage of these embodiments that a pulse wave may be generated that propagates in a direction between an inlet and an outlet. For example, the pulse wave may propagate either from the inlet to the outlet or from the outlet to the inlet. Thereby, the charged particle may be induced to move in the direction, even in the absence of a further actuator. In some embodiments, the first actuator may be configured to be switchable between the first mode of operation and a second mode of operation, wherein, in the second mode, when in a first time interval, each electrode at a position p in the array is at its maximum, and when in a second, subsequent, time interval (which can be contiguous to the first time interval), each electrode at a position p−1 is at its maximum. In these embodiments, n can be at least 3. It can be an advantage of these embodiments that the pulse wave may be switched between a direction of propagation, for example, in a first mode, from the inlet to the outlet, and in a second mode, from the outlet to the inlet. It can be an advantage of these embodiments that no further actuator may be required to determine a movement direction of a charged particle in the microfluidic channel.

In some embodiments wherein the array consists of two series of electrodes, the first actuator may be configured in such a way that, in operation, each electrode of the array sees its voltage at the maximum longer than at the minimum. It can be an advantage of embodiments of the disclosed technology that fast translocation of a charged particle may be achieved with a simple circuitry. It is a further advantage of embodiments of the disclosed technology that the simple circuitry may result in a limited density loss due to the presence of the first actuator. Herein, the density may be defined as microfluidic channel volume divided by microfluidic device volume.

In some embodiments, the first actuator may be configured in such a way that, in operation, a duration of each voltage cycle period is from 1 ns to 10 ns. The duration of the period may be selected depending on the desired speed of translocation. The first actuator may be configured in such a way that, in operation, the duration of the period of each electrode of the array is short enough so that a moment of inertia of the charged particle does not drop to zero or change sign between subsequent periods. Longer periods allow the charged particle to translocate from an initial electrode to an adjacent electrode faster, as long as the moment of inertia of the charged particle does not drop to zero or change sign. Thereby, the charged particle may arrive at the adjacent electrode when a further translocation is induced from the adjacent electrode to a further adjacent electrode, at a different side of the adjacent electrode than the initial electrode. The duration of the period may depend on, at least, a mass, a charge, a shape, and a size of the charged particle. A voltage range of the potential wave, for example, the voltage range between the minimum voltage and the maximum voltage, may depend on a field distribution in the microfluidic channel, which may depend on a geometry, such as a shape and dimensions, of the microfluidic channel. The duration and the voltage range that are implemented for a particular geometry and a particular charged particle, may be determined using any suitable microfluidic model. In some embodiments, the cyclically changing voltages of adjacent electrodes being out of phase means that the voltages of adjacent electrodes do not simultaneously reach a maximum, or reach a minimum. For example, voltages applied to adjacent electrodes may be temporally shifted, with respect to each other. In some embodiments, the first actuator may be configured in such a way that, in operation, the cyclically changing voltages of adjacent electrodes are out of phase by a time equal to from 1% to 99% of the period, such as from 10% to 90% of the period, such as from 20% to 80% of the period, such as from 30% to 70%, such as from 40% to 60% of the period. In some embodiments, the first actuator may be configured in such a way that, in operation, when the array consists of n series of electrodes, the cyclically changing voltages of adjacent electrodes are out of phase by a time equal to from 2%/n to 198%/n of the period, such as from 10%/n to 190%/n of the period, such as from 30%/n to 170%/n of the period, such as from 50%/n to 150%/n of the period, such as from 80%/n to 120%/n of the period, such as from 90%/n to 110%/n of the period, such as 100%/n of the period.

In some embodiments, the microfluidic device includes a second actuator, different from the first actuator, including a first electrode at a first end of the microfluidic channel, and a second electrode at a second end of the microfluidic channel, the second actuator being adapted for generating in operation a constant DC field between the first and the second electrodes, the first actuator being situated between the first electrode and the second electrode of the second actuator. This can be advantageous because the second actuator may induce a movement of a charged particle, when present, in the microfluidic channel, in addition to the translocation induced by the first actuator. This can be advantageous because it eases the selection of the direction of translocation of the charged particle.

In some embodiments, the microfluidic device includes a reservoir for containing a fluid including at least one charged particle, the reservoir being fluidically coupled to the microfluidic channel, and a third actuator adapted for inducing a movement of the at least one charged particle between the reservoir and the microfluidic channel by electro-osmosis or dielectrophoresis. In some embodiments, the dimensions of the reservoir are such that charged particles present in the reservoir can move past each other in the reservoir. In some embodiments, dimensions of the reservoir in at least two perpendicular directions are at least two times as large, such as at least ten times as large, as a width of the wider charged particle present in the fluid. Thereby, the reservoir is sufficiently large for charged particles to move past each other in the reservoir.

In some embodiments, the third actuator is configured to induce the movement of the at least one charged particle between the reservoir and the microfluidic channel by dielectrophoresis. In some embodiments, the third actuator includes a first electrode and a second electrode, wherein the third actuator is configured for generating an alternating current (AC) electric field between the first and second electrode. In some cases, the microfluidic channel and the reservoir are located between the first and second electrodes. In some instances, the first electrode faces the first end of the channel and the second electrode faces the second end of the channel. A direction of the AC electric field between the first and second electrodes can be at an angle of at most 30°, such as at most 10°, with respect to a longitudinal axis of the microfluidic channel. A direction of the AC electric field between the first and second electrodes can be parallel to a longitudinal axis of the microfluidic channel. In some embodiments, the third actuator may be configured to generate a non-uniform electric field. For example, the electrodes may differ by size or shape. The dielectrophoretic force exerted on the at least one charged particle can depend on the dielectric properties of the particle, relative to dielectric properties of an environment of the particle, such as a fluid. Furthermore, as dielectric properties may be frequency-dependent, the dielectrophoretic force may depend on a frequency of the applied electric field.

In alternative embodiments, the third actuator is configured to induce the movement of the at least one charged particle between the reservoir and the microfluidic channel by electro-osmosis. In these embodiments, the third actuator may include the first and second electrodes. In these embodiments, the inner walls of the channel may have a non-zero zeta potential, that is, a non-zero surface charge. On application of a DC electric field by the third actuator, ions in the fluid may start moving in a first direction of the electric field, thereby generating a flow of the fluid in the proximity of the inner wall in the first direction. The flow of the fluid may drag proximate charged particles in the first direction, thereby inducing the movement of the charged particles.

In some embodiments, the microfluidic device is a memory device. The memory device includes a fluid including at least one charged particle of each of a plurality of species. The fluid can include at least one charged particle of a first species and at least one charged particle of a second species. The disclosed technology is particularly useful when implemented as a memory device because it can increase the speed of writing and of reading of the sequence of particles in the channel encoding the information in the memory.

The memory device further includes: c) a writing element for arranging in a sequence the charged particles, thereby yielding a sequence of charged particles in the microfluidic channel, and wherein arranging of the charged particles includes arranging the charged particles of the first and second species in a particular order, wherein the channel is adapted to preserve the sequence of the charged particles; and d) a reading element for detecting the sequence of the charged particles in the microfluidic channel. The disclosed technology is, however, not limited to memory devices. That is, the microfluidic device may be any type of device implementing translocation of charged particles through a microfluidic channel.

In some embodiments wherein the microfluidic device is a memory device, the sequence of particles in the channel may correspond to stored information, that is, memory data. For instance, in the context of a binary numeral system, the particles of the first species may correspond to "ones," and the particles of the second species may correspond to "zeros." The sequence of particles of the first and second species in the channel may thereby correspond to a sequence of "zeros" and "ones." As such, the writing element may, by arranging in the sequence the particles in the microfluidic channel, store information in the microfluidic channel. Accordingly, the reading element may, by detecting the sequence of the particles in the microfluidic channel, read the information stored in the microfluidic channel.

In some embodiments wherein the device is a memory device, the microfluidic channel has a width that is smaller than twice the width of the narrowest of the charged particles but that is larger than the width of the widest of the charged particles. For this reason, it can be advantageous to have the widest of the charged particles that is smaller than twice the width of the narrowest of the charged particles. Such a width for the microfluidic channel can be advantageous as it permits a sequence of charged particles in the microfluidic channel to be retained over time. In some cases, the width of the microfluidic channel is constant along at least 60% of its length, such as at least 80% of its length, such as at least 90% of its length. In some embodiments, the channel may present a section having a width that is smaller than the narrower of the charged particle. This can be especially useful for memory devices when both the first and second end of the channel is open to a reservoir, as it prevents the beginning of the charged particle sequence or even the complete charged particle sequence from being discharged in the second reservoir. This section can be closer to the second end of the channel than to the first end. This section can be present at the second end of the channel.

In some embodiments where the charged particles all have charges of the same sign, the microfluidic channel may include charged inner surfaces, the charge of the inner surfaces having a same sign as the charge of the particles.

In some embodiments that include the third actuator, the third actuator is configured to generate an inhomogeneous field that may have a highest field at one electrode, and a lowest field at another electrode, and the charged particles may be selected in such a way that the highest field attracts a first species of charged particles while repelling a second species of charged particles. For instance, particles of a first species may have a dielectric constant that is lower than the dielectric constant of the fluid, and particles of a second species may have a dielectric constant that is higher than the dielectric constant of the fluid.

This can be advantageous because it allows the third actuator to selectively induce a movement of charged particles of a first species in a first direction, and induce a movement of a second species of particles in a second direction.

In some embodiments, the writing element is adapted for ensuring that exactly a single charged particle at a time moves into the channel. In some embodiments, wherein the charged particles include particles of at least two different species, for example charged particles of a first species and charged particles of a second species, the writing element may be adapted to determine which charged particle moves into the channel. In some embodiments, the writing element is an electronically controlled gate. In some embodiments, the electronically controlled gate is configured so that it can selectively let one species of particle into the channel but not another species of particle. In some embodiments, the electronically controlled gate may be configured so that one charged particle at a time may pass through the electronically controlled gate. In some embodiments, the electronically controlled gate includes an electrostatic barrier. In some embodiments, the electrostatic barrier is configured to, in a closed state of the electrostatic barrier, block at least one species of particle, such as all species of particles. In some embodiments, the electrostatic barrier includes a barrier electrode and is configured for generating a field for repelling the at least one species of charged particles, such as all species of charged particles. In some embodiments, the electrostatic barrier includes a dielectric material with a non-zero zeta potential that has the same sign than a non-zero zeta potential of the at least one species of charged particles, such as of all species of charged particles. Thereby, the at least one species of charged particles, such as all species of charged particles, is electrostatically repelled by the dielectric material, that is, by the electrostatic barrier. In the closed state of the electrostatic barrier, if the repulsion is sufficiently large, for example due to a sufficiently large nonzero zeta potential of the dielectric material, the at least one species of charged particles, such as all species of charged particles, is unable to pass the electrostatic barrier. Thereby, in some embodiments, in the closed state, the at least one species of charged particles, such as all species of charged particles, that is in the channel cannot leave the channel, and the at least one species of charged particles, such as all species of charged particles, that is not in the channel cannot enter the channel. In some embodiments wherein the electrostatic barrier includes a dielectric material with a non-zero zeta potential that has the same sign as a non-zero zeta potential of the at least one species of charged particles, the electrostatic barrier may further include a portal electrode. In these embodiments, the electrostatic barrier may be configured so that, in operation, the portal electrode generates an electric field opposing the electrostatic repulsion generated by the dielectric material. In these embodiments, the electrostatic barrier may be opened by the application of the electric field by the portal electrode. Thereby, in the opened state of the electrostatic barrier, the at least one species of particles may pass the electrostatic barrier, that is, move between the reservoir and the channel.

In some embodiments, the third actuator may be adapted to move a random charged particle from the reservoir to an entrance to the channel, wherein the writing element is adapted to detect which species of charged particle is present at the entrance. In these embodiments, if the writing element detects that the charged particle is required at that time for the sequence in the channel, the writing element may be configured to let the charged particle enter into the channel. In these embodiments, if the writing element detects that the charged particle should not, at that time, form part of the sequence in the channel, the writing element may be configured to move the charged particle away from the channel.

In some embodiments, the electronically controlled gate includes a gate reading element for detecting that a charged particle is present in the electronically controlled gate. In some embodiments, the gate reading element is adapted to detect the species of particle that is present in the electronically controlled gate. Advantageously, the detecting of the species of charged particle in the electronically controlled gate may be used to detect writing errors. In some embodiments, the gate reading element and the electrostatic barrier may be configured so that the electrostatic barrier is opened when the gate reading element detects that a charged particle to be added to the sequence of particles in the channel is present in the electronically controlled gate. In some embodiments, the electrostatic barrier may be configured to subsequently close when the gate reading element detects that the charged particle has moved passed the electrostatic barrier, further into the channel.

In some embodiments, the gate reading element is also the reading element, that is, the element that will read the data stored and retrieved from the channel. In these embodiments, the gate reading element may be an addressing element, as it may perform functions related to addressing data, that is, both writing of data and reading of data and possibly storing of data. Advantageously, in these embodiments, only a single reading element may be implemented in the channel. In some embodiments, the gate reading element does not include the reading element. Advantageously, in some embodiments, although the writing element, and therefore the gate reading element, may be included at the entrance (that is, first end or inlet) of the channel, the reading element may be included at a different location in the channel. In some embodiments, in particular in embodiments including the reservoir, if the reading element is at the entrance of the channel, detecting the sequence of charged particles by the reading element may result in losing the sequence of charged particles, for example as the charged particles move from the channel into the reservoir during the detecting of the sequence. In some embodiments including the reservoir, the reading element may be located at an entrance of the channel, and may be configured to detect the particles moving in and/or out of the channel. In these embodiments, detecting of the sequence of charged particles in the channel includes moving the particles from the channel to outside of the channel via the reading element. Thereby, the detecting may result in loss of the sequence of particles.

On the other hand, if the reading element is not at the entrance of the channel but at a location in the channel situated between the first and the second end of the channel, reading the data stored in the channel can be done without changing the sequence of charged particles in the channel and, hence, without losing the sequence of charged particles. In different embodiments, the reading element is located away from any end of the channel, for instance halfway along the channel.

In some embodiments, at least some of the features of the gate reading element may be identical to at least some of the features possible for the reading element. In some embodiments, the gate reading element includes the same features as the reading element. Advantageously, the gate reading element may be used to check that a charged particle of choice is moved into the channel.

In some embodiments, the reading element includes a capacitor or a field-effect transistor, or is configured for detecting a magnetic field. In some embodiments wherein the reading element includes the capacitor, the capacitor may include a first capacitor plate and a second capacitor plate. In some embodiments, the first plate may be located in the inner wall of the channel on a first side of the channel, and the second plate may be located in an inner wall of the channel on a second side of the channel opposite to the first side of the channel. In alternative embodiments, the capacitor includes a first capacitor plate in the inner wall of the channel at a first location, and a second capacitor plate in the same inner wall of the channel at a second location. Herein, the first location is closer to an entrance of the channel than the second location. In these embodiments, the capacitance of the capacitor may be different when the first particle is present between the first plate and the second plate than when the second particle is present between the first plate and the second plate. In some embodiments wherein the reading element includes the field-effect transistor, a surface of a gate of the field-effect transistor may be exposed to fluid in the channel. In some embodiments, the field-effect transistor is adapted to detect the charge of a particle in the proximity of the gate. In some embodiments wherein the particles of a first species have a different charge, for example, a different magnitude but a same sign, than the charged particles of a second species, the field-effect transistor is suitable to differentiate between the first particles and the second particles.

In some embodiments, the electronically controlled gate includes a gate actuator. In some embodiments, the gate actuator is adapted to induce a movement of at least one species of charged particles, such as all charged particles, at least at the entrance of the channel, close to the writing element. In some embodiments, the gate actuator may include at least a first electrode at the entrance of the channel. In some embodiments, the gate actuator may include a second electrode. In some embodiments, the gate actuator is configured to generate an electric field between the first and second electrodes of the gate actuator. In some embodiments, the gate actuator is configured to be able to attract all charged particles or a single species of the charged particle. In some embodiments, the gate actuator is configured to be able to repel all charged particles or a single species. In some embodiments, an electric field may be generated between an electrode of the gate actuator and an electrode of the third actuator to induce a movement of the particles. In these embodiments, the gate actuator and the third actuator may be adapted to induce a movement of at least one species of charged particles, such as of all species of charged particles, such as in the reservoir or in the channel, towards or away from the channel. In some embodiments, the gate actuator is adapted to induce the movement by means that are also available for the third actuator, such as by electro-osmosis and/or dielectrophoresis. Advantageously, in embodiments including the reservoir, upon application of an electric field between the first and second electrode of the gate actuator, the gate actuator may be used to attract a single species of charged particle from the reservoir to the entrance of the channel. Advantageously, the gate actuator may be used to repel other species of charged particles than the single species of charged particle. Thereby, the gate actuator may be used to facilitate the arranging in a sequence of the charged particles, by attracting the species of charged particle in the channel where they are required.

In addition, advantageously, the gate actuator may be adapted to induce a movement of a particle within the electronically controlled gate. In some embodiments, the gate actuator may be configured to move the particle within the electronically controlled gate from or to the gate reading element. In some embodiments, if the electrostatic barrier is opened, the gate actuator may be configured to move the charged particle within the electronically controlled gate through the electrostatic barrier, into the channel. Advantageously, the gate actuator may be used to induce the movement of charged particles in the writing element. However, in some embodiments, the gate actuator is not required: the movement of the charged particles in the writing element may also be induced by the third actuator. In some embodiments, the gate actuator may include the first electrode and the second electrode, wherein the first electrode is closer to an entrance of the channel than the second electrode, and wherein the second electrode is included between the first electrode and the electrostatic barrier. In some embodiments, the distance between the first electrode and the electrostatic barrier, may be sufficient to include a charged particle between them. In some embodiments, this distance may be such that only one charged particle may be present between them. In some embodiments, the gate actuator is configured to, if the single charged particle is present in the writing element, generate an electric field so that the first electrode repels all charged particles, whereas the second electrode attracts all charged particles. In some embodiments, the size of the second electrode may be such that only the single charged particle remains in the writing element. Alternatively, in some embodiments, the writing element may include a waiting channel between the gate actuator and the electrostatic barrier, the waiting channel having a length suitable for including only a single charged particle. In some embodiments, the gate actuator may be configured to, if a single charged particle is present in the waiting channel, generate an electric field to repel all charged particles. Thereby, all other particles than the single charged particle may be induced to move away from the writing element, so that only the single charged particle is present in the writing element, that is, in the waiting channel. In some embodiments, the gate actuator is, if the electrostatic barrier is opened, configured to generate an electric field for repelling the single charged particle. Thereby, the single charged particle may be induced to move past the electrostatic barrier, further into the channel.

Any features of any embodiment of the first aspect may be independently as correspondingly described for any embodiment of the second aspect of the disclosed technology.

In a second aspect, the disclosed technology relates to a method of translocating a charged particle along a microfluidic channel in a microfluidic device according to embodiments of the first aspect, including providing a device according to embodiments of the first aspect including a fluid including at least one charged particle, wherein at least part of the fluid is included in the microfluidic channel, and generating a potential wave along the microfluidic channel. The potential wave has the effect of putting in motion or accelerating the motion of charged particles present in the channel. In the second aspect, the disclosed technology can relate to a method of translocating a charged particle along a microfluidic channel in a microfluidic device according to embodiments of the first aspect, including providing a device according to embodiments of the first aspect including a fluid including at least one charged particle, wherein at least part of the fluid is included in the microfluidic channel, and applying a cyclically changing voltage to each electrode of the array according to a period multiplied by a natural number, wherein for at least one electrode (31, 32) the natural number equals 1 (for example, according to a same period) and in such a way that the cyclically changing voltage of adjacent electrodes are out of phase.

Any features of any embodiment of the second aspect may be independently as correspondingly described for any embodiment of the first aspect of the disclosed technology.

The disclosed technology will now be described by a detailed description of several embodiments of the disclosed technology. It is clear that other embodiments of the disclosed technology can be suitably implemented without departing from the disclosed technology.

Example: Memory Device

FIG. 1 is a schematic cross-section of part of a memory device according to embodiments of the disclosed technology. Two microfluidic channels 1 of the microfluidic device are depicted in this example but the device can include any number of microfluidic channels. Each microfluidic channel 1 includes a fluid with a plurality of charged particles 2. In this example, the charged particles 2 include first species 21 and second species 22 of charged particles. In the case of a memory device, two or more different species of charged particles can be used. The sign and magnitude of the charges of each of the first 21 and second species of particles 22 are the same.

A first actuator includes an array of electrodes 3 along the microfluidic channel 1. In this example, a wall of the microfluidic channel 1 is formed from a stack of alternating conductive 31 (that is, the electrodes of the array) and electrically insulating layers 32. In this example, the first actuator includes a first set of electrodes 311 and a second set of electrodes 312 within the array 3. More sets of electrodes are also possible. Herein, electrodes of the first set 311 alternate with electrodes of the second set 312. The first actuator is configured for applying first cyclically changing voltages 33 to the first set of electrodes 311 and second cyclically changing voltages 34 to the second set of electrodes 312. The first 33 and second cyclically changing voltages 34 are applied according to a same period. However, the first cyclically changing voltages 33 and the second cyclically changing voltages 34 are out of phase. In this example, the first 33 and second cyclically changing voltages 34 are out of phase by half of the period. In this example, each of the cyclically changing voltages 33 and 34 cycles between only two voltage values, that is, a minimum and a maximum voltage value. The minimum and maximum are the same for each of the electrodes 31 of the array 3.

In this example, the charged particles are cyclically electrophoretically attracted, thereby translocated, during each cycle, first, towards electrodes of the first set of electrodes 311. Next, the charged particles are attracted, thereby translocated, towards electrodes of the second set of electrodes 312. In principle, when a particular charged particle is at an electrode of the first set of electrodes 311, the particular charged particle may become attracted towards the two electrodes of the second set of electrodes 312 adjacent to the electrode. However, the particular charged particle may have a moment of inertia remaining from a previous cycle of the cyclically changing voltage. Thereby, the particular charged particle may preferentially translocate towards one of the two adjacent electrodes 312, so that the translocation may be always in a same direction. Alternatively, a second actuator (not shown) may be included in the microfluidic channel 1. The second actuator may include a first electrode at a first end of the microfluidic channel 1, and a second electrode at a second end of the microfluidic channel 1. The second actuator may be adapted for generating a constant DC field between the first and the second electrodes. As such, the second actuator may, by electrophoresis, determine a direction for translocation of the charged particles 2 within each microfluidic channel 1. Still alternatively, a third actuator, adapted for inducing a movement of the charged particles 2 by electro-osmosis or dielectrophoresis, may induce a desired direction for translocation.

Figure 2:
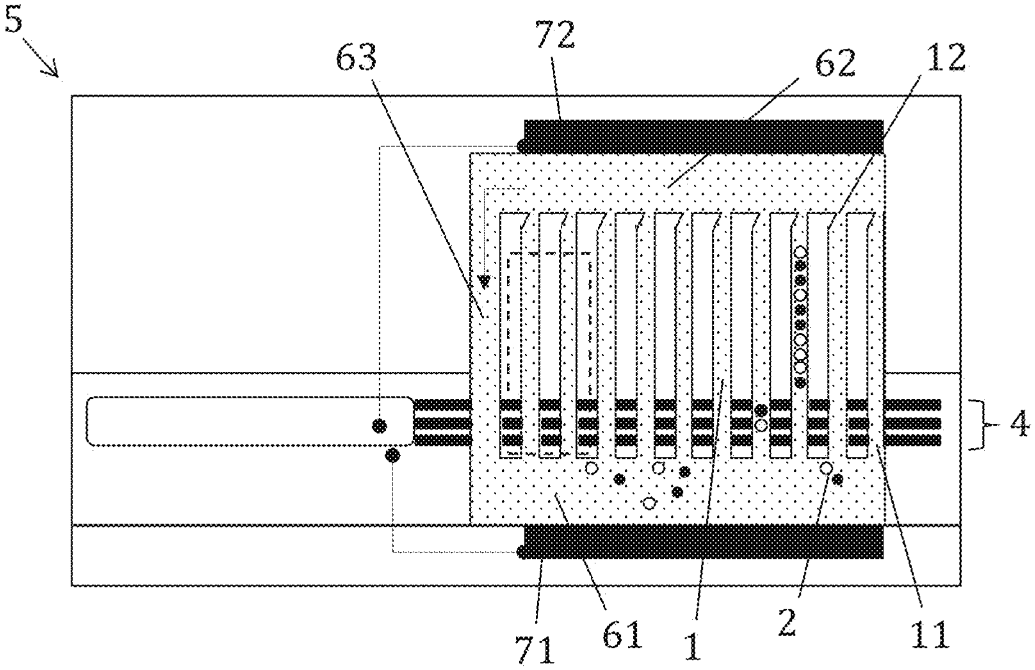
FIG. 2 is a schematic cross-section view of a memory device according to embodiments of the disclosed technology.

Reference is made to FIG. 2. In this example, the microfluidic device is a memory device 5, although the disclosed technology is not limited thereto. The rectangle defined by the dashed lines corresponds to the part of the memory device 5 shown, enlarged, in FIG. 1. In this example, the microfluidic device, that is, the memory device 5, includes a reservoir 61, including part of the fluid and a large amount of two species of charged particles 2. The reservoir 61 is fluidically coupled to a first end 11 of each of the microfluidic channels 1 of the memory device 5. The memory device 5 further includes a third actuator adapted for inducing a movement of the charged particles 2 between the reservoir 61 and the microfluidic channel 1 by electro-osmosis or dielectrophoresis. Herein, the third actuator includes a first electrode 71 and a second electrode 72. For example, an AC voltage may be applied between the first 71 and second electrode 72, thereby dielectrophoretically inducing a movement of the charged particles 2. Alternatively, a DC voltage may be applied to the first 71 and second electrode 72, thereby electro-osmotically inducing a movement of the charged particles 2. Herein, the electro-osmosis mainly occurs within the fluidic channels 1 due to their small diameter compared to that of the reservoir 61.

Each fluidic channel 1 includes a constricted opening at a second end 12 of the fluidic channel 1, fluidically coupled to a further reservoir 62. The constricted opening may prevent movement of the charged particles 2 through the second end 12. However, the fluid may pass through the second end 12 into the further reservoir 62, thereby preventing pressure build-up at the second end 12. Pressure build-up may occur, for example, due to electro-osmosis from the first end 11 to the second end 12, or due to the charged particles 2 moving through the fluidic channel 1 towards the second end 12, accompanied by movement of the fluid towards the second end 12. The pressure build-up could hamper or prevent movement of the charged particles 2 in the fluidic channel 1. A broad passage 63 enabling movement of fluid may enable movement between the reservoir 61 and further reservoir 62. This may prevent pressure from building up in the reservoir 61 and further reservoir 62.

The memory device 5 includes, at the first end 11 of each fluidic microchannel 1, a writing element for arranging in a sequence the charged particles 2. Thereby, a sequence of charged particles 2 in the microfluidic channel 1 may be obtained. The arranging of the charged particles includes arranging the first species 21 and second species of charged particles 22 in a particular order, wherein the channel 1 is adapted to preserve the sequence of the charged particles 2. The memory device 5 includes, at the first end 11 of each fluidic microchannel 1, a reading element for detecting the sequence of the charged particles in the microfluidic channel. The reading and writing elements are formed by a series of electrodes 4 at the entrance of each of the microfluidic channels 1.

Reference is, again, made to FIG. 1, which includes an enlarged side view of the series of elements 4. In this example, the series of elements 4 includes an electrostatic barrier 41, which may electrostatically repel the charged particles or allow the charged particles to pass. Instead of the electrostatic barrier 41, however, an electrodeposition gate could be used, configured for reversibly depositing material. Thereby, material may be deposited on the electrodeposition gate, for example, by reduction or oxidation of ions from the fluid, hindering passage of the charged particles 2 past the gate.

The series of elements 4 further includes a reading element 42, for example, a capacitor or field-effect transistor. In this example, the series of elements 4 further includes a writing element that can include a gate actuator, including a first gate electrode 44 and a second gate electrode 43. The first gate electrode 44 may be configured for selectively attracting a charged particle 21 or 22. For example, during a write operation, an AC electric field may be generated by the first gate electrode 44 of each channel so as to selectively dielectrophoretically attract only first species of charged particles 21 or only second species of charged particles 22. Herein, for each channel, a different species of particle 21 or 22 may be attracted. The AC electric field may, for instance, be generated between the first gate electrode 44 of and the first electrode 71 of the third actuator. Next, an AC signal for attracting all charged particles 21 and 22 may be applied to the second gate electrode 43. At the same time, the first gate electrode 44 may generate an AC signal for repelling all charged particles 21 and 22. The repelling will cause the charged particle 21 or 22 in each microfluidic channel 1 to move towards the second gate electrode 43 of the channel 1, while any other particles 21 and 22 that may have only partially entered or come close to the channel 11 are repelled into the reservoir 61. Thereby, only a single charged particle 21 or 22 is able to enter each channel 1. Herein, the reading element 43 may check whether the charged particle 21 or 22 is wanted to enter the channel 1, that is, required in the sequence in the channel 1. If the charged particle 21 or 22 is wanted, the electrostatic barrier 41 may be opened to allow the charged particle to enter the channel. If not, the electrostatic barrier 41 may, for example, remain closed, and the charged particle 21 or 22 may be removed from the channel entrance 11.

Once the charged particle 21 or 22 enters the channel 1, the first actuator 2 induces a translocation of the charged particles 21 and 22 through the channel 1, from the first end 11 to the second end 12. The write operation may be repeated a number of times so as to obtain a sequence of charged particles 21 and 22 in each channel 1.

During an operation of reading the sequence in each channel 1, the charged particles may be induced to move, for example, translocate, through the opening at the first end 11 of the channel 1. For this, the electrostatic barrier 41 is first opened. Next, the first actuator 3, possibly in combination with the second actuator and/or third actuator, may enable fast translocation of the charged particles 21 and 22 past the reading element 42. The reading element 42 may detect the sequence of the charged particles 21 and 22 in each of the channels 1. In this example, the read operation is destructive, since it requires all charged particles 21 and 22 to pass by the reading element 42, and therefore flow out of the channels 1 and into the reservoir 61. Therefore, in this example, a re-write operation may be required after the read operation.

In this example, a very specific memory device has been described. However, it will be understood that the memory device may be any memory device including charged particles, for example, any type of colloidal nanofluidic memory device. For example, the specific reading and writing elements, and their operation, are an example of how reading and writing in such memory devices may possibly be performed. However, it will be understood that very different reading and writing mechanisms may be suitably implemented in accordance with the disclosed technology.

It is to be understood that although some embodiments, specific constructions, and configurations, as well as materials, have been discussed herein for devices according to the disclosed technology, various changes or modifications in form and detail may be made without departing from the scope of this disclosed technology. Steps may be added or deleted to methods described within the scope of the disclosed technology.

What is claimed is:

1. A microfluidic memory device comprising:

a microfluidic channel;

a first actuator comprising an array of electrodes configured to translocate a plurality of charged particles along the microfluidic channel, the array of electrodes disposed perpendicular to the microfluidic channel, the array of electrodes comprising a repeating pattern of 2 electrodes belonging to different series, the first actuator configured to apply a cyclically changing voltage to each electrode of the array of electrodes according to a period, the first actuator further configured to apply the cyclically changing voltages to the array of electrodes such that adjacent electrodes of the array of electrodes are out of phase by ½ of the period; and a writing element comprising an electronically controlled gate configured to arrange the plurality of charged particles in a sequence in the microfluidic channel, the plurality of charged particles comprising a first particle species and a second particle species arranged in a particular order that corresponds to memory data, wherein the microfluidic channel is configured to preserve the first particle species and the second particle species arranged in the particular order corresponding to the memory data.

2. The microfluidic memory device according to claim 1, wherein the first actuator is configured in such a way that, in operation:

each electrode of the array of electrodes sees its voltage changing cyclically according to the period multiplied by a natural number, wherein for at least one electrode of the array of electrodes the natural number equals 1.

3. The microfluidic memory device according to claim 2, wherein the cyclically changing voltages of every other electrode of the array of electrodes are in phase.

4. The microfluidic memory device according to claim 1, wherein each electrode of the array of electrodes sees its voltage changing cyclically within a range of voltages having a minimum and a maximum separated by a voltage from 1 to 10V.

5. The microfluidic memory device according to claim 1, wherein each electrode of the array of electrodes sees its voltage changing cyclically within a range of voltages having a minimum and a maximum, wherein the minimum takes the same voltage value for each electrode of the array of electrodes, and wherein the maximum takes the same voltage value for each electrode of the array of electrodes.

6. The microfluidic memory device according to claim 1, wherein the cyclically changing voltage of each electrode of the array of electrodes at a position p is at its maximum when the cyclically changing voltage of each electrode of the array of electrodes at a position $p-1$ is at its minimum.

7. The microfluidic memory device according to claim 1, wherein a duration of each period is from 1 ns to 10 ns.

8. The microfluidic memory device according to claim 1, wherein each electrode of the array of electrodes sees its voltage changing cyclically between only two voltage values being a minimum voltage and a maximum voltage.

9. The microfluidic memory device according to claim 1, wherein the cyclically changing voltage of each electrode of the array of electrodes has a same minimum equal to 0 V.

10. The microfluidic memory device according to claim 1, further comprising a second actuator, different from the first actuator, wherein the second actuator comprises a first electrode at a first end of the microfluidic channel, and a second electrode at a second end of the microfluidic channel, wherein the second actuator is configured to generate a constant DC field between the first and the second electrodes, and wherein the first actuator is situated between the first electrode and the second electrode of the second actuator.

11. The microfluidic memory device according to claim 1, wherein the array of electrodes has an extent measured along the length of the microfluidic channel of at least 70% of the length of the microfluidic channel.

12. The microfluidic memory device according to claim 1, further comprising:

a reservoir for containing a fluid comprising the plurality of charged particles, wherein the reservoir is fluidically coupled to the microfluidic channel; and a third actuator configured to induce a movement of the plurality of charged particles between the reservoir and the microfluidic channel by electro-osmosis or dielectrophoresis.

13. The microfluidic memory device according to claim 12, wherein the microfluidic channel comprises a first end and a second end, wherein the plurality of charged particles are induced to move to the first end by the third actuator, and wherein the plurality of charged particles are induced to move out of the microfluidic channel via the second end.

14. The microfluidic memory device according to claim 13, wherein the second end of the microfluidic channel comprises a constricted opening.

15. The microfluidic memory device according to claim 1, further comprising a fluid comprising the plurality of charged particles, wherein at least part of the fluid is located in the microfluidic channel, and if a reservoir is present, another part of the fluid is located in the reservoir.

16. The microfluidic memory device according to claim 1, further comprising:

a reading element configured to detect the sequence of the plurality of charged particles in the microfluidic channel.

17. The microfluidic memory device according to claim 16, wherein the reading element preserves the particular order of the first particle species and the second particle species in the microfluidic channel.

18. A method of translocating a plurality of charged particles, the method comprising:

providing the microfluidic memory device according to claim 1 comprising a fluid comprising the plurality of charged particles, wherein at least part of the fluid is located in the microfluidic channel; and generating a potential wave along the microfluidic channel.

19. The microfluidic memory device according to claim 1, wherein the electronically controlled gate comprises a gate reading element configured to detect the species of the plurality of charged particles that is present in the electronically controlled gate.

20. The microfluidic memory device according to claim 19, wherein the electronically controlled gate comprises an electrostatic barrier configured to electrostatically repel a charged particle of the plurality of charged particles or allow the charged particle of the plurality of charged particles to enter the microfluidic channel based on the species of the charged particle as detected by the gate reading element.

21. The microfluidic memory device according to claim 1, wherein the electronically controlled gate comprises a gate actuator that comprises two gate electrodes disposed perpendicular to the microfluidic channel at an entrance of the microfluidic channel, and wherein the gate actuator is configured to induce a movement of a charged particle of the plurality of charged particles in the writing element.

22. The microfluidic memory device according to claim 1, wherein the writing element is configured to allow only a single charged particle of the plurality of charged particles to enter the microfluidic channel at a time.

23. The microfluidic memory device according to claim 1, wherein the microfluidic channel has a width that is smaller than twice the width of the narrowest of the plurality of charged particles but that is larger than the width of the widest of the plurality of charged particles.

* * * * *